United States Patent Office 3,309,786
Patented Mar. 21, 1967

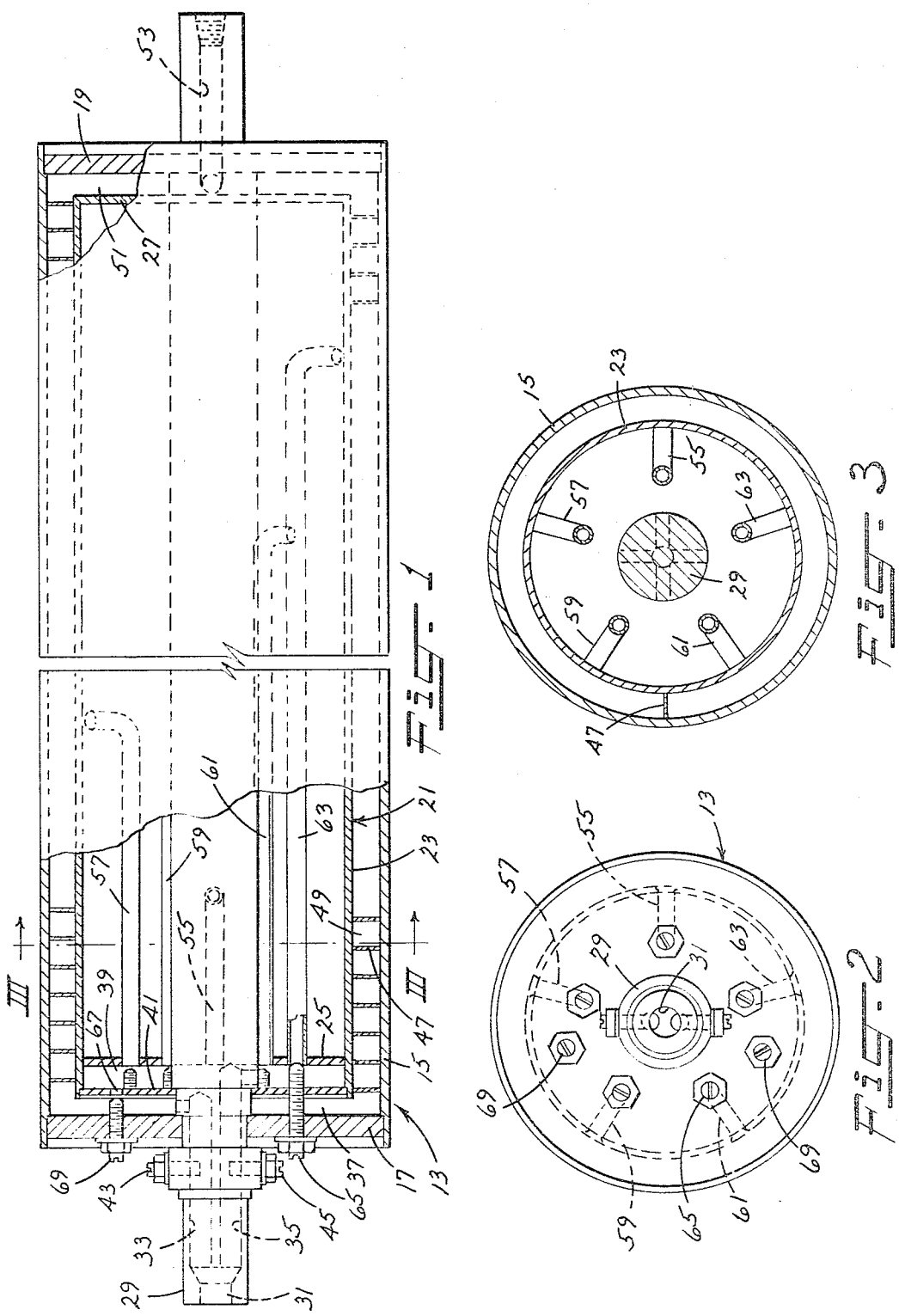

3,309,786
HEATED ROLL
John D. Conti, Elkins Park, Pa., assignor to FMC Corporation, Philadelphia, Pa., a corporation of Delaware
Filed Mar. 18, 1965, Ser. No. 440,717
5 Claims. (Cl. 34—124)

The present invention relates to a heated roll which is designed for use in drying and/or in laminating of traveling webs of flexible materials.

In drying and/or laminating for traveling webs of flexible materials it is often necessary to supply greater amounts of heat to the different longitudinal portions of a heated roll to provide for a uniform surface temperature along the length of the roll or to maintain a desired temperature differential between selected rolls areas. For example, in drying a cellophane web it is essential that the end sections of a heated roll be at a lower temperature than the central portion thereof to avoid overdrying of the longitudinal edge portions thereof. Such overdrying renders the cellophane web edges extremely brittle, and causes them to shrink more than the central portions of the web so that the web exhibits curly or floppy edges which are easily torn.

Similarly, when laminating thermoplastic webs by means of heated pressure rolls it may be necessary to supply more heat to certain roll sections to compensate for excessive heat losses and thereby minimize or perhaps maximize differences in the bond between different areas of the laminated webs. For example, it may be desirable to have a uniform bond between the major portions of laminated webs while certain other areas thereof are only lightly laminated to each other to permit easy separation. While various heated roll constructions have been proposed none have proven to be entirely satisfactory. Accordingly, a primary object is to provide a generally new or improved and more satisfactory heated roll.

Another object is the provision of a heated roll which is designed to provide uniform or differential temperature conditions along the length thereof.

Still another object is to provide an improved heated roll in which the temperature of different longitudinal sections thereof can be accurately and rapidly controlled.

A further object is to provide an improved heated roll which is of simple and economical construction and which is easy to operate.

Still further objects will appear from the following description.

These objects are accomplished in accordance with the present invention by a heated roll, the surface temperature of the successive longitudinal portions of which are accurately and individually controlled. More particularly, the heated roll of the present invention includes a pair of drums, one of which is positioned inside of and in spaced relationship with the other. A heated fluid is delivered into one end of the roll, caused to travel a helical path in the space between the annular drum walls and is then discharged from the opposite end of the roll. Individually controlled means are provided for also delivering heated fluid into the space between the annular drum walls at selected longitudinally spaced locations of the roll.

The fluid employed in heating the roll of the present invention may consist of a gaseous or liquid heat transfer medium or a combination of both. For example, satisfactory results could be obtained using wet or dry steam, hot water or hot oil.

For a greater understanding of this invention reference is made to the following detailed description and drawing in which FIGURE 1 is a side view of the heated roll of the present invention, with a portion thereof being broken away to show the interior construction thereof;

FIGURE 2 is a view of the left end of the roll illustrated in FIGURE 1; and

FIGURE 3 is a transverse vertical section taken along the line III—III of FIGURE 1.

With reference to the drawing, the heated roll of the present invention includes a drum 13 having an annular wall or shell 15 and closed end walls 17 and 19. A second drum 21, also having an annular wall or shell 23 and end walls 25 and 27, is positioned inside of the drum 13 and in spaced relationship with the walls thereof. To facilitate roll rotation, a shaft 29 extends centrally through and is fixed to the drums 13 and 21.

At one end the shaft 29 is provided with an opening 31 which connects with passages 33 and 35 and into which a heated fluid is delivered from a suitable source, not shown. The passage 33 opens into a fluid inlet chamber 37 which is formed between the end walls 17 and 25 of the drums 13 and 21, while the passage 35 leads to a supply chamber 39 formed by the end wall 25 of the drum 21 and an adjacent partition 41. Valves 43 and 45 are provided for regulating the flow of heated fluid through the respective passages 33 and 35.

A wall 47 partitions the space between the annular walls 15 and 23 of the drums 13 and 21 into a passage 49 which serves to guide the heated fluid along a desired helical path as it travels from the chamber 37 to an outlet chamber 51 which is formed between the drum end walls 19 and 27. The spent fluid is discharged from the outlet chamber 51 through a passage 53 which is connected to suitable means, not shown, for heating and recirculating the fluid through the roll.

In addition to heating of the roll surface as described above a number of conduits, such as shown at 55, 57, 59, 61 and 63, are provided for delivering heated fluid from the supply chamber 39 and into selected areas of the helical passage 49. The flow of heated fluid into the respective conduits 55, 57, 59, 61 and 63 is controlled independently by individual valves 65 which extend through the end walls 17 and 25 of the two drums for easy access.

If desired, the heated fluid may be permitted to flow between the inlet and supply chambers 37 and 39 through openings or passages 67 provided in the end wall 25 of the drum 21. The flow through these openings is controlled by valves 69 which also extend through the end wall 17 of the drums 13.

In operation, with the valves 43 and 45 in open position a heated fluid, such as hot oil, is delivered through the shaft opening 31 and passages 33 and 35 into the inlet and supply chambers 37 and 39. The hot oil flows from the chamber 37 along the spiral channel 49 and into the outlet chamber 51 from which it is discharged through the passage 53. If it is desired to heat particular sections of the roll to a higher temperature than could be achieved by fluid circulating along the helical channel 49, hot oil is delivered from the supply chamber 39 into one or more of the conduits 55, 57, 59, 61 and 63 which open into such particular roll sections. It will be apparent that the valves 65 permit the flow of hot oil into the conduits 55, 57, 59, 61 and 63 to be individually controlled so that the amount of hot oil delivered to and thus the tempreature of the section served by a particular conduit could be accurately regulated.

If it is desired to vary the rate of flow of the hot oil from the chamber 37 or 39 or both, valves 43 and 45 can be adjusted accordingly and/or the flow of hot oil to or from such chamber can be changed by adjusting one or both of the valves 69. In other words, some control over the flow of hot oil into the chambers 37 and 39 can be achieved by adjusting the respective valves 43 and 45. Partial closing of one of these valves 43 and 45 would not only decrease the flow of hot oil through the passage 33 or 35 into which such valve projects but would also increase the rate at which the hot oil flows through the other of such passages. The valves 69 give the roll further flexibility since they permit hot oil to flow between the chambers 37 and 39 and thus permit more oil to flow from either of such chambers than is supplied thereto by the respective passage 33 or 35.

It is to be understood that changes and variations may be made without departing from the spirit and scope of the invention as defined in the appended claims.

I claim:

1. A heated roll including a pair of rotatable drums each having an annular wall and closed end walls, one of said drums positioned within the other and being spaced from the annular and end walls thereof, the spaces between the adjacent drum end walls forming fluid inlet and outlet chambers, means for delivering a heated fluid into said inlet chamber, means for discharging spent fluid from said outlet chamber, means partitioning the space between the drum annular walls into a helical channel extending between said inlet and outlet chambers, means providing a fluid supply chamber adjacent to said inlet chamber, means for delivering a heated fluid into said supply chamber, a series of conduits extending from said supply chamber and opening into said helical channel at different locations spaced longitudinally of said inner drum, and valve means for individually controlling the flow of heated fluid into said conduits from said supply chamber.

2. A roll as defined in claim 1 further including a passage between said inlet and supply chambers and valve means for controlling the flow of fluid through said passage.

3. A roll as defined in claim 1 further including valve means for controlling the flow of fluid into said inlet and supply chambers.

4. A roll as defined in claim 2 further including valve means for controlling the flow of fluid into said inlet and supply chambers.

5. A heated roll including a pair of drums each having an annular wall and closed end walls, one of said drums being positioned within the other and being spaced from the annular and end walls thereof, a shaft extending axially of said drums, the spaces between the adjacent drum end walls forming fluid inlet and outlet chambers, a wall extending transversely across said inner drum and cooperating with the adjacent end wall thereof to provide a fluid supply chamber next to said inlet chamber, passages in said shaft for delivering a heated fluid into said inlet and supply chambers and for discharging spent fluid from said outlet chamber, valve means for controlling the flow of heated fluid through the passages leading to said inlet and supply chambers, a partition dividing the space between the drum annular walls into a helical channel extending between the inlet and outlet chambers, conduits extending from said supply chamber and opening into said helical passage at different locations spaced longitudinally of the inner drum, valve means for independently controlling the flow of heated fluid into said conduits, an opening in said wall extending transversely across said inner drum permitting heated fluid to pass between said inlet and supply chambers and valve means for controlling the flow of fluid through said opening.

References Cited by the Examiner

UNITED STATES PATENTS

| 1,583,333 | 3/1926 | Bigum | 34—124 X |
| 2,068,077 | 1/1937 | Rosin et al. | 34—57 |

DONLEY J. STOCKING, *Primary Examiner.*

A. D. HERRMANN, *Assistant Examiner.*